April 11, 1939.  L. SCRUGGS  2,153,847

CHUCK OR TOOL HOLDER

Filed April 15, 1937

INVENTOR;
LOYD SCRUGGS
BY Wells R Church
ATTORNEY

Patented Apr. 11, 1939

2,153,847

UNITED STATES PATENT OFFICE 2,153,847

CHUCK OR TOOL HOLDER

Loyd Scruggs, University City, Mo.

Application April 15, 1937, Serial No. 137,030

5 Claims. (Cl. 279—52)

This invention relates to chucks or tool holders of the kind that are used on fractional horsepower electric motors and other portable, hand-manipulated devices of the kind that are employed to drive or operate a tool, implement or instrument which is intended to be guided or manipulated by the hand of the user.

The main objects of my invention are to provide a chuck or tool holder of the kind mentioned, that is inexpensive to manufacture, easy to operate to clamp or release the tool carried by same, and of such construction that the rotatable part or parts are normally housed inside of a shield or finger grip which remains at rest in close proximity to the tool, thereby facilitating the operation of guiding or manipulating the tool due, of course, to the fact that the user's fingers are located directly at the tool instead of at a point some distance away from the tool. Another object is to provide a chuck or tool holder of the kind above described in which the shield or finger grip is shiftably mounted, and constructed so that it will hold one element of the structure against rotary movement when another element of the structure is being turned to clamp or release the tool.

Figure 1 of the drawing is a vertical longitudinal sectional view of a chuck or tool holder constructed in accordance with my invention, illustrating the shield or finger-grip in the position which it occupies when a tool is being applied to or removed from the chuck.

Figure 3:
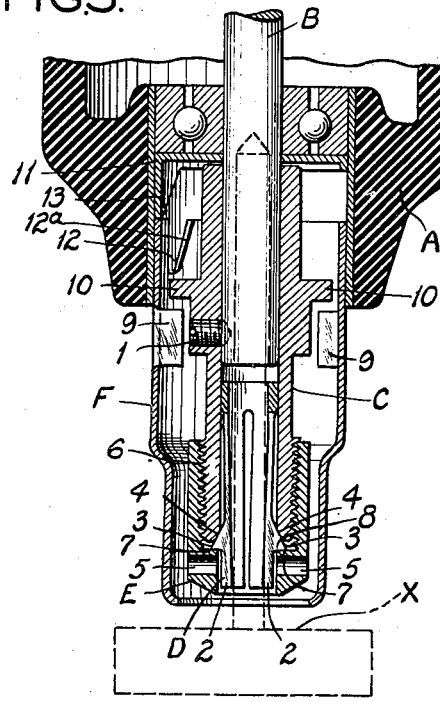
Figure 3 is a longitudinal sectional view of the chuck showing the shield or finger grip in the position it normally occupies when the tool is in use.

In the accompanying drawing which illustrates my invention, A designates the front end portion of the housing of a fractional horsepower electric motor whose armature shaft B has attached to same a chuck for holding a tool $x$, shown in broken lines in Figure 3. The said chuck comprises a jaw supporting member C attached to the armature shaft B in any suitable way as, for example, by means of a set screw 1, tool gripping jaws carried by the member C and formed preferably by a conventional spring collet D arranged inside of the supporting member C and provided with expansible and contractible gripping jaws 2, having inclined external surfaces 3 which coact with oppositely inclined surfaces 4 on the supporting member C to move the jaws 2 into clamping engagement with the shank of the tool $x$ when an actuating nut E on the jaw supporting member C is rotated in one direction. When the nut E is rotated in the opposite direction, the jaws 2 will expand and thus release the shank of the tool. To facilitate the turning of the nut E, said nut is provided with a plurality of radially disposed holes 5 in any one of which a pin or similar device $y$ may be inserted, as shown in broken lines in Figure 1, during the operation of clamping or releasing the shank of the tool carried by the chuck.

Preferably, the jaw actuating nut is rotatably mounted on an externally screw-threaded portion 6 of the jaw carrying member C, and said nut is provided adjacent its front end with an internal shoulder 7 that is adapted to bear against a shoulder 8 on the collet which is disposed at right angles to the longitudinal axis of the chuck. When the nut E is rotated in a direction to cause it to travel longitudinally of the supporting member C in one direction, for example, downwardly looking at Figure 1, the inherent resiliency of the jaws 2 causes them to expand and simultaneously move in the direction of travel of the nut E, due to the pressure which the inclined external surfaces 3 on the jaws exert on the oppositely inclined surfaces 4 on the jaw carrying member C. When the nut E is rotated in the opposite direction it will travel upwardly, looking at Figure 1, and the internal shoulder 7 thereon will coact with the shoulder 8 on the collet to bodily move the collet endwise relatively to the supporting member C, whereby the inclined surface 4 on said supporting member, by engaging the oppositely inclined surface 3 on the jaws, causes the jaws to contract and tightly clamp the shank of the tool.

Figure 4:
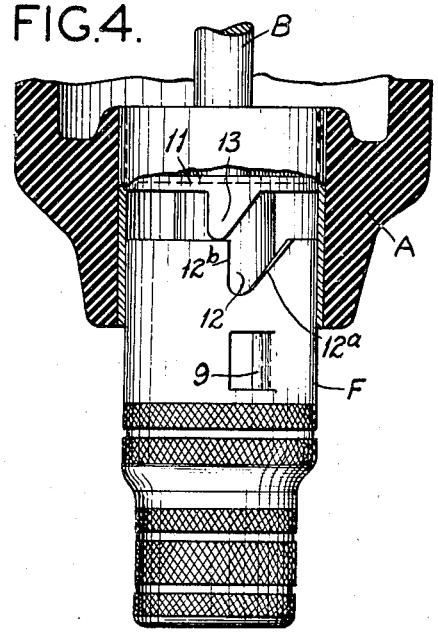
Figure 4 is a side elevational view illustrating the parts of the chuck in the positions which they occupy in Figure 3.

When the tool is in use, all portions of the chuck including the jaw actuating nut E, are housed inside of a shield F whose front end portion constitutes a finger grip that is located in close proximity to the tool $x$, as shown in Figures 3 and 4. Accordingly, the user can guide or manipulate the tool with great accuracy because the user's fingers are located directly at the tool and are engaged with a portion of the chuck (the finger-grip F) which at that time is stationary. The shield or finger-grip F is so constructed and arranged that it can be retracted or moved endwise into the position shown in Figures 1 and 2 when it becomes necessary to turn the jaw actuating nut E to clamp or release the shank of the tool. Preferably, the shield F is formed by a tubular-shaped member that is reciprocatingly mounted in the front end portion A of the motor housing and said shield is so constructed that when it is retracted or moved end-wise into its inactive position preparatory to expanding or contracting the tool holding jaws 2, a means will be rendered operative to hold the jaw supporting member C against rotary movement when the jaw actuating nut E is turned. In the form of my invention herein illustrated, the means just referred to that is employed to hold the jaw carrying member against rotation is formed by one or more internal lugs or wings 9 on the shield F that are adapted to cooperate with one or more lugs 10 on the jaw supporting member C, said coacting lugs 9 and 10 being so disposed that the lugs 10 on the jaw carrying member will not strike against the lugs 9 on the shield F when said shield is in its normal position shown in Figure 3, but the lugs 9 on the shield F will be disposed in the path of rotation of the lugs 10 on the jaw carrying member when the shield F is retracted or held in its inactive position shown in Figure 1. Preferably, the shield F is provided with two lugs or wings 9 arranged diametrically opposite each other and formed by slitting the shield F and bending the slitted portions inwardly, thereby producing integral holding devices 9 on the shield.

Figure 1:
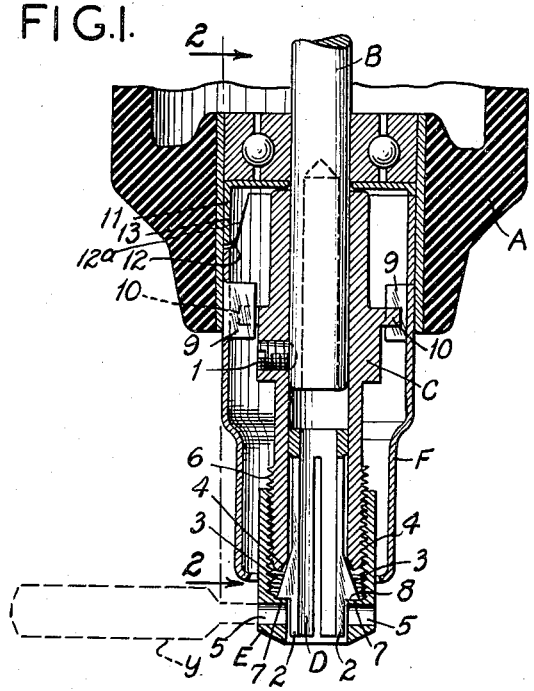
Figure 2:
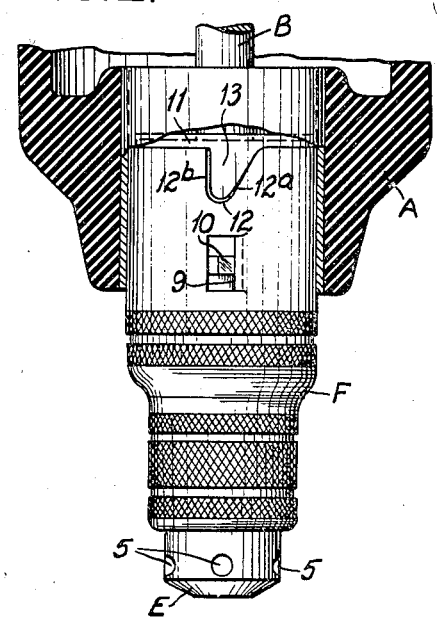
Figure 2 is a side elevational view of said chuck taken on the line 2—2 of Figure 1 looking in the direction indicated by the arrows.

In order to facilitate restoration of the shield F or movement of said shield back to its normal position, shown in Figure 3, after a tool has been clamped in the jaws 2 of the chuck the shield F is mounted in the motor housing A in such a way that, if said shield is oscillated or given a quarter turn when set in the position shown in Figure 2, said shield will be automatically moved end-wise into the position shown in Figures 3 and 4, wherein the finger-gripping portion of the shield is positioned over the jaw actuating nut E. As shown in Figures 1 and 3, the front end portion A of the motor housing is provided with a metal bearing sleeve 11 inside of which the shield F is mounted in such a way that said shield is capable of being turned and also reciprocated relatively to the stationary bearing 11 in the motor housing. The automatic movement of the shield F back to its normal position, shown in Figure 4, is effected by a cam or inclined surface on the shield which coacts with a stationary cam or inclined surface carried by the motor housing.

Preferably, the shield F is provided at its inner end with two oppositely disposed notches 12, each of which has an inclined surface 12a and the motor housing A is provided with two stationary cams 13 which are so located inside of the bearing sleeve 11 that when the shield F is moved end-wise to uncover the jaw actuating nut E, the cams 13 on the motor housing will enter the notches 12 at the inner end of the shield F. Consequently, if the shield F is given a quarter turn, anti-clockwise, when said shield is set in the position shown in Figure 2, the cams 13 will coact with the inclined surfaces 12a on the shield to positively move said shield end-wise into the position shown in Figure 4. While the coacting cam surfaces or inclined surfaces on the motor housing and shield F are not absolutely essential to the successful operation of my improved chuck, I prefer to construct the chuck in the manner herein illustrated on account of the ease with which the shield F can be restored to the position it is intended to occupy when the tool held by the chuck is being guided or manipulated. When the shield F is provided with one or a plurality of notches 12, each having an inclined surface 12a and a straight surface 12b disposed parallel to the longitudinal axis of the chuck as herein illustrated, it will be unnecessary for the user to grasp and tightly hold the shield F in the operation of turning the nut E to expand or contract the tool holding jaws 2 of the chuck. However, I wish it to be understood that the particular shape or form of the coacting means on the shield and motor housing for automatically effecting end-wise movement of the shield back to its normal position may be varied without departing from the spirit of my invention.

A fractional horsepower electric motor or other tool operating device equipped with a tool chuck of the kind herein illustrated permits a tool to be guided or manipulated with great accuracy due, of course, to the fact that the user's fingers, which grip or hold the device, are arranged in very close proximity to the tool and in engagement with a part of the device, to wit, the finger grip F which at that time is stationary, all of the rotating parts of the chuck being effectively housed inside of said stationary finger grip. Such a chuck is easy to operate to install or remove a tool on account of the efficient means provided for holding the jaw carrying member C against rotation during the operation of turning the jaw actuating nut E and such a chuck has the added advantage of being of sufficiently rugged construction to insure its successfully standing up under the rough usage to which such devices are subjected in ordinary service.

Having thus described my invention, what I claim as new and desire to secure by Letters Patent is:

1. In a fractional horsepower motor or other similar tool operating device, the combination of a housing, a drive shaft, a jaw supporting member on said shaft equipped with tool holding jaws, a rotatable device on said jaw supporting member for actuating said jaws, a shield or finger-grip mounted on said housing so as to normally cover said jaw actuating device but to be capable of being moved end-wise into a position to expose said jaw actuating device and permit it to be manipulated, coacting means on said shield and jaw supporting member for holding said jaw supporting member against rotation when said shield is in its shifted position, and means whereby a rotary movement imparted to said shield when in its shifted position, causes said shield to be shifted end-wise back to its normal position in overlapping relationship with said jaw actuating device.

2. In a fractional horsepower motor or other similar tool operating device, the combination of a housing, a drive shaft, a jaw supporting member connected to said shaft and provided with tool holding jaws, an actuating device for said jaws rotatably mounted on said supporting member, and a longitudinally shiftable shield or finger grip mounted in said housing and proportioned so as to normally encase said jaw supporting member and jaw actuating device, said shield being capable of being retracted to expose said jaw actuating device, coacting means on said shield and jaw supporting member for holding said member against rotation when said shield is in its retracted position, a stationary cam carried by said housing, and a surface on said shield which coacts with said cam to move said shield end-wise back to its normal position in overlapping relationship with said jaw actuating device, when said shield is turned relatively to said housing while said shield is set in its retracted position.

3. In a fractional horsepower motor or other similar portable tool operating device, the combination of a housing that is adapted to be moved to manipulate the tool operated by the device, a drive shaft carried by said housing and provided with a jaw carrying member that projects beyond the end of said housing, tool holding jaws in said member, a rotatable means on the projecting portion of said jaw carrying member for expanding and contracting said jaws, and a finger grip on the housing constructed and arranged so as to normally surround and project beyond the terminal end of said jaw actuating means when the device is in use and to be capable of being shifted into a position to expose said jaw actuating means and permit it to be manipulated during the operation of inserting or removing a tool in the jaws, said finger grip being positioned beyond the end of the housing and constructed and arranged so as to be grasped by the fingers of the user in the operation of manipulating the tool on the work.

4. In a fractional horsepower motor or other similar portable tool operating device, the combination of a housing that is adapted to be moved to manipulate the tool operated by the device, a drive shaft carried by said housing and provided with a jaw carrying member that projects beyond the end of said housing, tool holding jaws in said member, a rotatable means on the projecting portion of said jaw carrying member for expanding and contracting said jaws, a finger grip on the housing constructed and arranged so as to normally surround and project beyond the terminal end of said jaw actuating means when the device is in use and to be capable of being shifted into a position to expose said jaw actuating means and permit it to be manipulated during the operation of inserting or removing a tool in the jaws, said finger grip being positioned beyond the end of the housing and constructed and arranged so as to be grasped by the fingers of the user in the operation of manipulating the tool on the work, and a part on the interior of said finger grip arranged so as to move into interlocking relationship with said jaw carrying member when said finger grip is retracted to expose said jaw actuating means, whereby said jaw carrying member may be held against rotary movement when the jaw actuating means is being actuated to clamp or release the tool.

5. A device of the kind described in claim 4, in which the finger grip has a terminal portion of reduced diameter having a knurled external surface.

LOYD SCRUGGS.